United States Patent
Chen et al.

(10) Patent No.: US 10,999,578 B2
(45) Date of Patent: May 4, 2021

(54) TRANSCODING MEDIA CONTENT USING AN AGGREGATED QUALITY SCORE

(71) Applicant: Google LLC, Mountain View, CA (US)

(72) Inventors: Chao Chen, Fremont, CA (US); Balineedu Adsumilli, Foster City, CA (US); Shawn Singh, Shrewsbury, MA (US); Yilin Wang, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/612,889

(22) PCT Filed: Dec. 12, 2017

(86) PCT No.: PCT/US2017/065781
§ 371 (c)(1),
(2) Date: Nov. 12, 2019

(87) PCT Pub. No.: WO2019/117864
PCT Pub. Date: Jun. 20, 2019

(65) Prior Publication Data
US 2020/0204804 A1    Jun. 25, 2020

(51) Int. Cl.
*H04N 19/124* (2014.01)
*H04N 19/103* (2014.01)
(Continued)

(52) U.S. Cl.
CPC ......... *H04N 19/124* (2014.11); *H04N 19/103* (2014.11); *H04N 19/154* (2014.11);
(Continued)

(58) Field of Classification Search
None
See application file for complete search history.

(56) References Cited

U.S. PATENT DOCUMENTS 9,049,420 B1    6/2015  Wang et al.
9,445,110 B2 *  9/2016  Leontaris .............. H04N 19/80
(Continued)

FOREIGN PATENT DOCUMENTS

EP    3022936 A1    5/2016

OTHER PUBLICATIONS

Moldovan Arghir-Nicolae et al: "QoE-aware video resolution thresholds computation for adaptive multimedia", 2017 IEEE International Symposium on Broadband Multimedia Systems and Broadcasting (BMSB), IEEE, Jun. 2017, pp. 1-6.
(Continued)

*Primary Examiner* — Chikaodili E Anyikire
(74) *Attorney, Agent, or Firm* — Young Basile Hanlon & MacFarlane, P.C.

(57) ABSTRACT

Systems and methods for transcoding media content are disclosed. In some embodiments, the method includes obtaining a transcoded media content that is transcoded from an uploaded media content. The method includes determining a plurality of degradation metric values corresponding to the transcoded media content based on the uploaded media content and the transcoded media content, each degradation metric value corresponding to a different degradation metric type. The method includes mapping each degradation metric value to a respective calibrated score to obtain a plurality of calibrated scores. The method includes determining an aggregated quality score of the transcoded media content based on the plurality of calibrated scores and an exponential weighting function. The exponential weighting function exponentiates each of the calibrated scores by a respective weighting exponent and aggregates the exponentiated calibrated scores. The method includes selectively reencoding the transcoded media content based on the aggregated quality score.

20 Claims, 5 Drawing Sheets

(51) Int. Cl.
  *H04N 19/154* (2014.01)
  *H04N 19/172* (2014.01)
  *H04N 19/176* (2014.01)
  *H04N 19/61* (2014.01)

(52) U.S. Cl.
  CPC ......... *H04N 19/172* (2014.11); *H04N 19/176* (2014.11); *H04N 19/61* (2014.11)

(56) References Cited

U.S. PATENT DOCUMENTS

| | | | |
|---|---|---|---|
| 2011/0060792 A1 | 3/2011 | Ebersviller | |
| 2011/0069138 A1* | 3/2011 | Ali ..................... | H04N 19/865 348/14.1 |
| 2014/0067898 A1 | 3/2014 | Steiner et al. | |
| 2016/0212432 A1* | 7/2016 | Wang .................. | H04N 19/154 |

OTHER PUBLICATIONS

Written Opinion of the International Preliminary Examining Authority for International Application No. PCT/US2017/065781 dated Sep. 12, 2019, 8 pgs.

International Search Report and the Written Opinion of the ISA for International Application No. PCT/US2017/065781 dated May 4, 2018, 15 pgs.

* cited by examiner

TRANSCODING MEDIA CONTENT USING AN AGGREGATED QUALITY SCORE

BACKGROUND

In digital video and audio delivery, as in many different industries and fields of study, it is a challenge to define quantitative metrics that robustly characterize qualitative properties. It is even more problematic when the qualitative properties are inherently subjective or dependent on human perception. For example, it is difficult to automate a process that can quantify whether the quality of an encoded video is good, not good, great, or unwatchable. Quantitative metrics, however, are valuable because they enable more objective analysis and scientific reasoning.

In operating a large-scale media processing infrastructure (e.g., broadcast TV, video streaming services, online music services, and cloud personal storage of media content), the quality of an encoded media content is a very important metric. Because of the amount of content being handled by these systems, it is necessary to automate the processes that monitor, verify, and even improve media content quality. At the heart of this challenge is the task of defining appropriate quantitative metrics that give meaningful indications about the quality of video and audio processing. In practice, however, these metrics may provide limited ways to meaningfully interpret their numerical values. Furthermore, these metrics are usually only meaningful when compared to values assigned to other media contents to determine which is better. It is difficult, however, to determine the magnitude of how much better a particular media content is.

Furthermore, quality metrics usually make tradeoffs about how much "coverage" they provide within the domain of all possible audio and video content. Some metrics only do well on a subset of the domain (e.g., focusing on speech quality instead of general audio quality), while other metrics may generalize better to any media content but provide only a very specific measurement that cannot be interpreted as an overall quality measurement. Good coverage of a metric matters because different compressed videos may have different types of errors that are attributed to different root causes and that manifest in different manners. Metrics that focus only on one such root cause cannot characterize all these different aspects of "quality." Furthermore, most metrics for audio and video quality are defined by modeling what makes audio and video be considered "good" or high quality. However, this approach ignores what causes audio and video quality to be considered "bad" or low quality. As a result, existing metrics do a better job of characterizing slight differences in quality only when quality is already high, but they do not do as well when it comes to characterizing differences in quality when the quality is poor.

SUMMARY

This disclosure relates generally to methods and system for transcoding media using aggregated quality scores. According to some implementations of the present disclosure, a method is disclosed. The method includes receiving, by one or more processors, an uploaded media content and obtaining, by the one or more processors, a transcoded media content. The transcoded media content is transcoded from the uploaded media content. The method further includes determining, by the one or more processors, a plurality of degradation metric values corresponding to the transcoded media content based on the uploaded media content and the transcoded media content. Each degradation metric value corresponds to a different degradation metric type. The method also includes mapping, by the one or more processors, each degradation metric value of the plurality of degradation metric values to a respective calibrated score to obtain a plurality of calibrated scores. The plurality of calibrated scores are all numerical values on a common interval. The method also includes determining, by the one or more processors, an aggregated quality score of the transcoded media content based on the plurality of calibrated scores and an exponential weighting function. The exponential weighting function exponentiates each of the calibrated scores by a respective weighting exponent and aggregates the exponentiated calibrated scores. The method further includes selectively reencoding, by the one or more processors, the transcoded media content based on the aggregated quality score.

According to some implementations of the method, each of the respective weighting exponents is equal to a same constant value. In some of these implementations, the exponential weighting function is:

$$M = \Sigma_{i=0}^{N} \alpha_i m_i^{\gamma}$$

where M is the aggregated quality score, N is a total number of different degradation metrics represented in the plurality of degradation metric values, $m_i$ is an $i^{th}$ calibrated score of the plurality of calibrated scores, $\alpha_i$ is a weighting factor corresponding to the $i^{th}$ calibrated score, and $\gamma$ is the weighting exponent.

According to some implementations of the method, each respective weighting exponent is specific to the respective calibrated score that the respective weighting exponent exponentiates. In some of these implementations, the exponential weighting function is:

$$M = \Sigma_{i=0}^{N} \alpha_i m_i^{\gamma_i}$$

\where M is the aggregated quality score, N is a total number of different degradation metrics represented in the plurality of degradation metric values, $m_i$ is an $i^{th}$ calibrated score of the plurality of calibrated scores, $\alpha_i$ is a weighting factor corresponding to the $i^{th}$ calibrated score, and $\gamma_i$ is the respective weighting exponent that exponentiates the $i^{th}$ calibrated score.

According to some implementations of the method, mapping each degradation metric value of the plurality of degradation metric values to a respective calibrated score includes, for each degradation metric value, obtaining a mapping mechanism corresponding to the degradation metric type of the degradation metric value and inputting the degradation metric value to the mapping mechanism to obtain the respective calibrated score.

According to some implementations of the method, selectively reencoding the transcoded media content based on the aggregated quality score includes determining a predicted demand for the transcoded media content, determining a bitrate of the transcoded media content, determining a maximum score threshold and a lower score threshold based on the predicted demand. Furthermore, when the aggregated quality score is less than the maximum score threshold and greater than the lower score threshold, the method includes storing the transcoded media content. When the aggregated quality score is greater than the maximum score threshold, the method includes reencoding the uploaded media content at an increased bitrate that is greater than the bitrate of the transcoded media content. When the aggregated quality score is less than the lower score threshold, the method includes reencoding the uploaded media content at a decreased bitrate that is less than the bitrate of the transcoded media content.

According to some implementations of the method, reencoding the transcoded media content based on the aggregated quality score includes comparing the aggregated quality score to a maximum score threshold. When the aggregated quality score is less than the maximum score threshold, the method includes storing the transcoded media content. When the aggregated quality score is greater than the maximum score threshold, the method includes adjusting one or more encoding parameters to decrease the aggregated quality score and reencoding the uploaded media content based on the adjusted encoding parameters.

According to some implementations of the method, obtaining the transcoded media content includes receiving one or more encoding parameters and encoding the uploaded media content into the transcoded media content using the one or more encoding parameters. According to some implementations of the method, the transcoded media content includes video content and/or audio content.

According to some implementations of the present disclosure, a media content delivery system is disclosed. The media content delivery system includes a non-transitory storage that stores computer-readable data, a network interface, and one or more processors that execute computer-executable instructions. The instructions, when executed, cause the one or more processors to receive an uploaded media content via the network interface and obtain a transcoded media content. The transcoded media content is transcoded from the uploaded media content. The instructions further cause the one or more processors to determine a plurality of degradation metric values corresponding to the transcoded media content based on the uploaded media content and the transcoded media content. Each degradation metric value corresponds to a different degradation metric type. The instructions further cause the one or more processors to map each degradation metric value of the plurality of degradation metric values to a respective calibrated score to obtain a plurality of calibrated scores. The plurality of calibrated scores are all numerical values on a common interval. The instructions further cause the one or more processors to determine an aggregated quality score of the transcoded media content based on the plurality of calibrated scores and an exponential weighting function. The exponential weighting function exponentiates each of the calibrated scores by a respective weighting exponent and aggregates the exponentiated calibrated scores. The instructions further cause the one or more processors to selectively reencode the transcoded media content based on the aggregated quality score.

According to some implementations of the media content delivery system, each of the respective weighting exponents is equal to a same constant value. In some of these implementations, the exponential weighting function is:

$$M = \Sigma_{i=0}^{N} \alpha_i m_i^{\gamma}$$

where M is the aggregated quality score, N is a total number of different degradation metrics represented in the plurality of degradation metric values, $m_i$ is an $i^{th}$ calibrated score of the plurality of calibrated scores, $\alpha_i$ is a weighting factor corresponding to the $i^{th}$ calibrated score, and γ is the weighting exponent.

According to some implementations of the media content delivery system, each respective weighting exponent is specific to the respective calibrated score that the respective weighting exponent exponentiates. In some of these implementations, the exponential weighting function is:

$$M = \Sigma_{i=0}^{N} \alpha_i m_i^{\gamma}$$

\where M is the aggregated quality score, N is a total number of different degradation metrics represented in the plurality of degradation metric values, $m_i$ is an $i^{th}$ calibrated score of the plurality of calibrated scores, $\alpha_i$ is a weighting factor corresponding to the $i^{th}$ calibrated score, and γ is the respective weighting exponent that exponentiates the $i^{th}$ calibrated score.

According to some implementations of the media content delivery system, mapping each degradation metric value of the plurality of degradation metric values to a respective calibrated score includes, for each degradation metric value, obtaining a mapping mechanism corresponding to the degradation metric type of the degradation metric value, and inputting the degradation metric value to the mapping mechanism to obtain the respective calibrated score.

According to some implementations of the media content delivery system, selectively reencoding the transcoded media content based on the aggregated quality score includes determining a predicted demand for the transcoded media content, determining a bitrate of the transcoded media content and determining a maximum score threshold and a lower score threshold based on the predicted demand. Furthermore, when the aggregated quality score is less than the maximum score threshold and greater than the lower score threshold, the instructions cause the one or more processor to store the transcoded media content. When the aggregated quality score is greater than the maximum score threshold, the instructions cause the one or more processor to reencode the uploaded media content at an increased bitrate that is greater than the bitrate of the transcoded media content. When the aggregated quality score is less than the lower score threshold, the instructions cause the one or more processor to reencode the uploaded media content at a decreased bitrate that is less than the bitrate of the transcoded media content.

According to some implementations of the media content delivery system, reencoding the transcoded media content based on the aggregated quality score includes comparing the aggregated quality score to a maximum score threshold. When the aggregated quality score is less than the maximum score threshold, the instructions cause the one or more processor to store the transcoded media content. When the aggregated quality score is greater than the maximum score threshold, the instructions cause the one or more processor to adjust one or more encoding parameters to decrease the aggregated quality score and reencode the uploaded media content based on the adjusted encoding parameters.

According to some implementations of the media content delivery system, obtaining the transcoded media content includes receiving one or more encoding parameters and encoding the uploaded media content into the transcoded media content using the one or more encoding parameters. According to some implementations of the media content delivery system, the transcoded media content includes video content and/or audio content.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

In the field of media coding, it is difficult to automate the process of determining the overall quality of an encoding of a media content (e.g., video data and/or audio data). Many metrics focus on how "good" the quality of a particular encoding is, and are, therefore, unsuited to gauge whether the encoding quality of a media content is poor. Other metrics are very narrowly defined, and thus are not indicative of whether the overall quality of the encoding is sufficient or too poor to consume.

Furthermore, in a large-scale media processing infrastructure, one common concern is the use of bandwidth when streaming or otherwise delivering media content. Typically, media contents that are encoded at higher bitrates result in higher quality media contents, while media contents that are encoded at relatively lower bitrates result in lower quality media contents. Media contents that are encoded at these higher bitrates, however, may consume increased storage space to store and increased bandwidth to deliver (e.g., stream or download). In some scenarios, the quality gains that are realized by encoding the media content at a higher bitrate may not be discernable or of consequence to a consumer of the media content. Thus, the bandwidth consumed by a very popular media content that is streamed or otherwise delivered millions of times may be decreased by encoding the media content at a lower bitrate without substantially decreasing the overall quality of the media content.

The present disclosure is directed to optimizing media encodings by determining an aggregated quality score of a transcoded media content. The aggregated quality score is an aggregation of a set of two or more calibrated scores. Each calibrated score is determined from a respective degradation metric value, where each degradation metric value corresponds to a different type of degradation metric. For example, a first degradation metric value may be indicative of a degree of blockiness detected in the transcoded media content, while a second degradation metric may be indicative of a degree of blurriness detected in the transcoded media content. In this example, a first calibrated score may be determined from the blockiness degradation metric, while a second calibrated score may be determined from the blurriness degradation metric. The first and second calibrated scores reside on the same scale (e.g., between zero and one).

Figure 1:
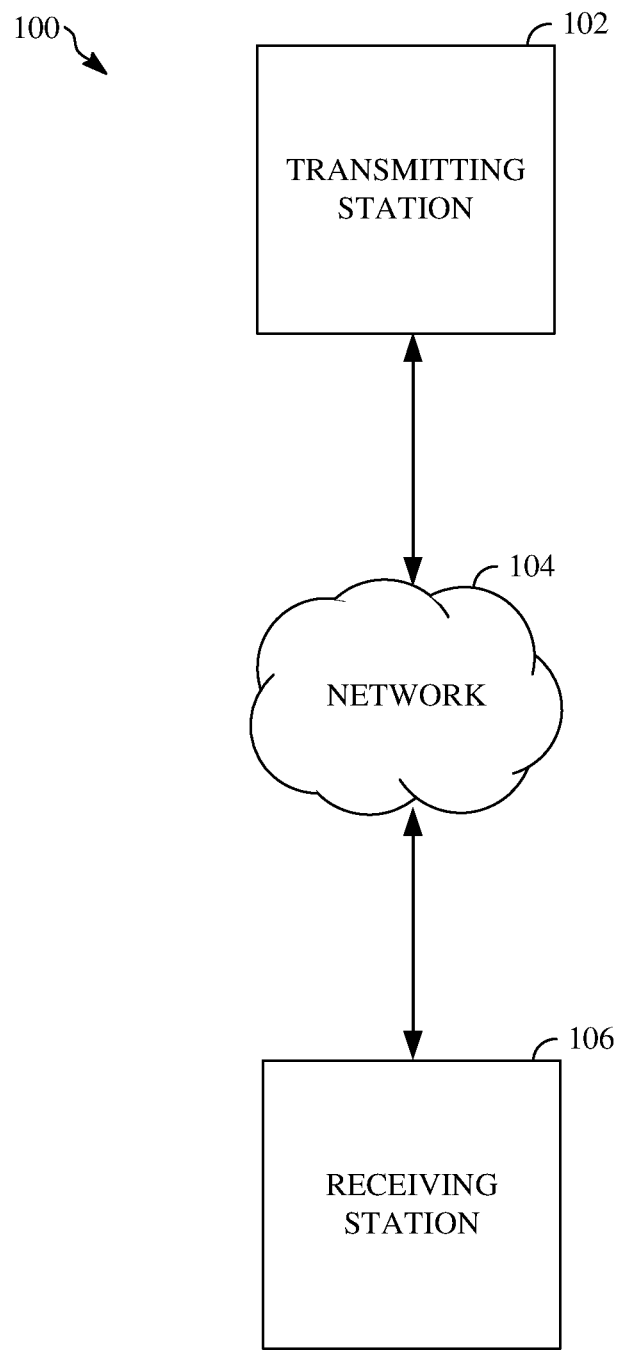
FIG. 1 is a schematic of a video encoding and decoding system.

The disclosed system may objectively determine degradation metric values based on the transcoded media content and the uploaded media content from which the transcoded media is derived. The calibrated scores are scores that are contained on the same interval and may be correlated to subjective quality assessments of a media content with respect to a corresponding type of degradation metric. The system may map each degradation metric value to a respective calibrated score using a mapping mechanism corresponding to the type of degradation metric, whereby the mapping mechanism maps the degradation metric value to a calibrated score. The proposed system may exponentiate each calibrated score by a weighting exponent. In some implementations, the system may further weight each exponentiated calibrated score by a respective weighting factor. The system may aggregate exponentiated (and potentially weighted) calibrated scores to obtain an aggregated quality score. The aggregated quality score may be used to determine whether to reencode the media content using new encoded parameters selected to improve or reduce the overall quality of the media content. According to some implementations, only degradation metrics are used to determine the calibrated scores FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple computing devices, such as a large-scale media processing system.

A communication network 104 can connect the transmitting station 102 and a receiving station 106 for encoding and decoding of a media stream, such as a video stream or a media stream. Specifically, the media stream can be encoded at the transmitting station 102, and the encoded media stream can be decoded at the receiving station 106. The communication network 104 can be, for example, the Internet. The communication network 104 can also be a local area network (LAN), wide area network (WAN), virtual private network (VPN), cellular telephone network, or any other means of transferring the video stream from the transmitting station 102 to, in this example, the receiving station 106.

Figure 2:
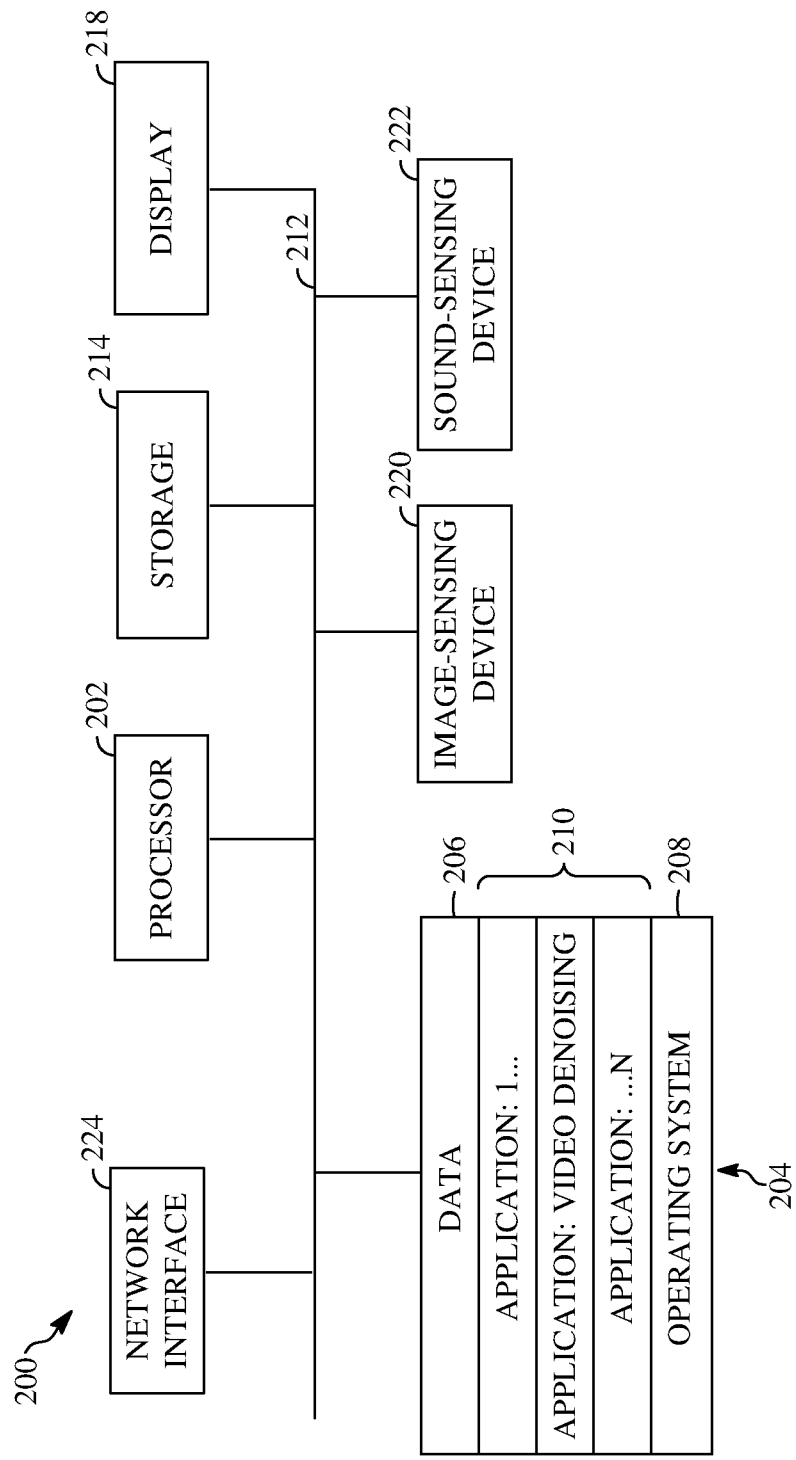
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the communication network 104. In another implementation, a video stream can be encoded and then stored for transmission at a later time to the receiving station 106 or any other device having memory. In one implementation, the receiving station 106 receives (e.g., via the communication network 104, a computer bus, and/or some communication pathway) the encoded video stream and stores the video stream for later decoding. In an example implementation, a real-time transport protocol (RTP) is used for transmission of the encoded video over the communication network 104. In another implementation, a transport protocol other than RTP may be used, e.g., a Hypertext Transfer Protocol-based (HTTP-based) video streaming protocol.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, a server computer, and the like.

A CPU 202 in the computing device 200 can be a conventional central processing unit. Alternatively, the CPU 202 can be any other type of device, or multiple devices, now existing or hereafter developed, capable of manipulating or processing information. Although the disclosed implementations can be practiced with one processor as shown, e.g., the CPU 202, advantages in speed and efficiency can be achieved using more than one processor.

A memory 204 in the computing device 200 can be a read-only memory (ROM) device or a random-access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that causes the CPU 202 to perform the methods described herein. For example, the application programs 210 can include applications 1 through N, which further include a video coding application that performs the methods described herein. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example, a camera, or any other image-sensing device 220, now existing or hereafter developed, that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device, now existing or hereafter developed, that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

The computing device 200 may further include a network interface 224. The network interface 224 may include one or more transceivers that receive data from and transmit data to a communication network 104. The network interface 224 may perform wired and/or wireless communication using any suitable communication protocols.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more processors) that can be coupled directly or across a local area or other network. The memory 204 can be distributed across multiple machines, such as a network-based memory or memory in multiple machines performing the operations of the computing device 200.

Although depicted here as one bus, the bus 212 of the computing device 200 can be composed of multiple buses. Further, the secondary storage 214 can be directly coupled to the other components of the computing device 200 or can be accessed via a communication network and can comprise an integrated unit such as a memory card or multiple units such as multiple memory cards. The computing device 200 can thus be implemented in a wide variety of configurations.

Figure 3:
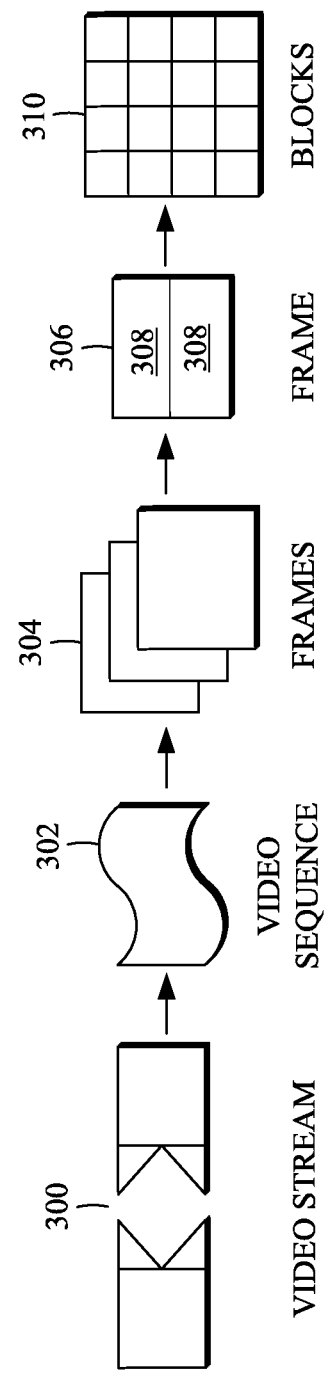
FIG. 3 is a diagram of a typical video stream to be encoded and subsequently decoded.

FIG. 3 is a diagram of an example of a video stream 300 to be encoded and subsequently decoded. The video stream 300 may include media content, as described above, such as video data and/or audio data. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into frame blocks 310, which can contain data corresponding to, for example, 16×16 pixels in the frame 306. The frame blocks 310 can also be arranged to include data from one or more segments 308 of pixel data. The frame blocks 310 can also be of any other suitable size, such as 4×4 pixels, 8×8 pixels, 16×8 pixels, 8×16 pixels, 16×16 pixels, or larger. Unless otherwise noted, the terms block and macroblock are used interchangeably herein.

Figure 4:
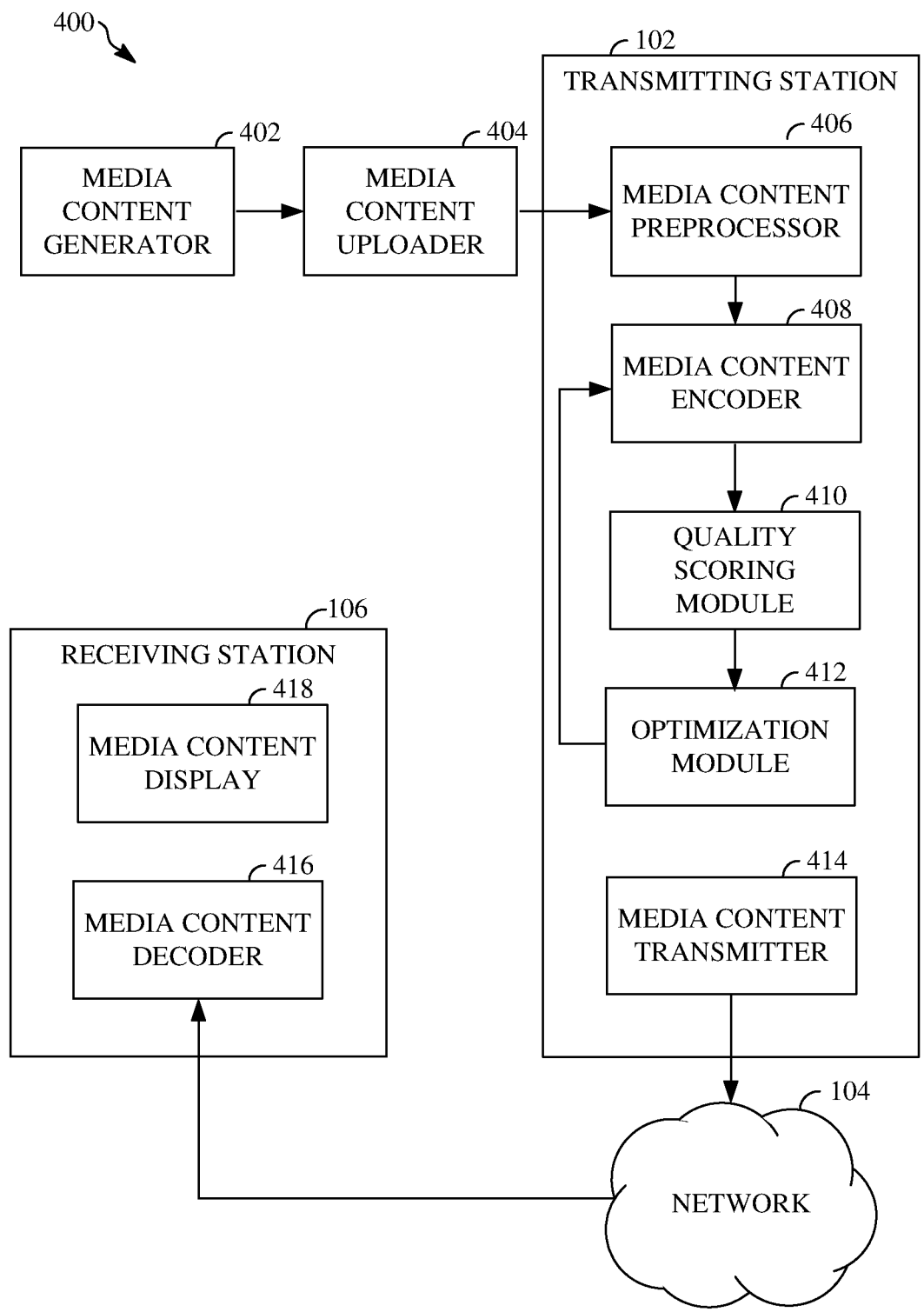
FIG. 4 is a block diagram of an example of a media content delivery system.

FIG. 4 is a block diagram of an example of a media content delivery system 400. The media content delivery system 400 may be configured to stream or otherwise deliver media, such as video content and/or audio content, to a receiving station 106. In the illustrated example, the media content delivery system 400 includes a media content generator 402; a media content uploader 404; a transmitting station, such as the transmitting station 102, described above; a communication network, such as the communication network 104, described above; and a receiving station, such as the receiving station 106, described above.

The transmitting station 102 includes a media content preprocessor 406, a media content encoder 408, a quality scoring module 410, an optimization module 412, and a media content transmitter 414. The receiving station 106 includes a media content decoder 416 and a media content display 418. In some embodiments, the media content delivery system 400 may include fewer, additional, and/or different components than those described herein.

The media content generator 402 generates media content, such as video content, audio content, photographic images, or other suitable media content. The media content generator 402 may include one or more video capture devices, such as a video camera, and/or one or more audio capture devices, such as a microphone. The one or more video capture devices may be standalone video capture devices or a component of a computing device, such as the computing device 200 of FIG. 2. Similarly, the one or more audio capture devices may be a standalone audio capture device, or a component of a computing device, such as the computing device 200 of FIG. 2. In some embodiments, the media content generator 402 may include one or more software applications configured to generate media content, or other suitable media content.

The media content uploader 404 is configured to upload media content generated by the media content generator 402 to the transmitting station 102. The media content uploader 404 may include any suitable media content uploader, such as a software application running on a computing device, such as the computing device 200 described above. A user may select one or more media contents to upload to the transmitting station 102. In response to the user selection, the media content uploader 404 may upload the selected media contents to the transmitting station. The media content uploader 404 may encode the media content using any suitable video and/or audio codec before uploading the media content to the transmitting station 102.

The media content preprocessor 406 is configured to receive the uploaded media content and to perform preprocessing on the media content. For example, in some implementations, the media content preprocessor 406 may decode the uploaded media content to an intermediate content. The intermediate media content may be less compressed than the uploaded media content. In some implementations, the media content preprocessor 406 may perform other suitable processes to improve the quality of the media content. In some implementations, the media content preprocessor 406 may "chunk" the intermediate media content into a series of chunks. In doing so, the media content encoder 408 may encode the chunks of the intermediate media content in a parallel and/or distributed manner.

In some implementations, the media content encoder 408 is configured to encode the intermediate media content according to a media content coding scheme. The media content encoder 408 may implement one or more video and/or audio codecs to encode the media content. The media content encoder 408 may encode the intermediate media content (or the chunks that make up the intermediate media content) into one or more transcoded media contents. The media content encoder 408 may encode each transcoded media content into a respective format (e.g., at different spatial resolutions such as 4 k, 1080p, 720p, 480p, 360p, 240p, etc.). In this way, the transcoded media contents can be played on different types of receiving stations.

In encoding the intermediate media content into a transcoded media content, the media content encoder 408 may receive a set of encoding parameters. The encoding parameters may define the settings with which the transcoded media content is encoded. The encoding parameters may include a bitrate at which the transcoded media content is encoded, the motion parameters that are used to encode the transcoded media content, the quantization parameters used to encode the transcoded media content, deblocking filter parameters, and/or any other suitable parameters. Each of the encoding parameters may be adjusted to improve the quality of the media content. The improved quality, however, may come at the expense of storage, bandwidth consumption, and/or decoding times. For example, the higher the bitrate of a transcoded media content, the better the quality but the more storage is required to store the transcoded media content and the more bandwidth that is required to transmit/stream the transcoded media content. Similarly, increasing the quantization parameters may increase the quality of the transcoded media content, but, in doing so, the media content requires more storage space and bandwidth. Upon completing the encoding, the media content encoder 408 outputs the one or more transcoded media contents.

In some implementations, the media content preprocessor 406 does not generate an intermediate media content. In these implementations, the media content encoder 408 may be configured to transcode the uploaded media content directly into the transcoded media content. In these implementations, the media content encoder 408 may receive a set of encoding parameters. The encoding parameters may define the settings with which the transcoded media content is encoded. The encoding parameters may include a bitrate at which the transcoded media content is encoded, the motion parameters that are used to encode the transcoded media content, the quantization parameters used to encode the transcoded media content, deblocking filter parameters, and/or any other suitable parameters. Each of the encoding parameters may be adjusted to improve the quality of the media content. The media content encoder 408 may receive the uploaded media content and may encode the uploaded media content into the transcoded media content based on the encoding parameters.

The quality scoring module 410 determines an aggregated quality score based on the transcoded media content and the uploaded media content from which the transcoded media content was encoded. In operation, the quality scoring module 410 determines two or more degradation metric values corresponding to the transcoded media content in view of the uploaded media content. Each degradation metric value corresponds to a different type of degradation metric. The degradation metrics may be metrics associated with artifacts, features, and errors that contribute to reducing the quality of the video. As opposed to traditional metrics used to assess how "good" an encoding is, the degradation metrics are metrics that tend to indicate "poor" quality encodings. For example, the degradation metrics may include, but are not limited to, a blocking metric, a blurring metric, a ringing metric, a noise metric, a banding metric, a jitter metric, a flicker metric, a saliency metric, a temporal consistency metric, a local motion saliency metric, a sharpness or modulation transfer function metric, a peak-signal-to-noise metric, a structural similarity (SSIM) metric, a self-reference based learning-free evaluation of quality (SLEEQ) metric, an interlacing or staircase metric, a distortion metric, and/or a warping metric. Each of these metrics may be measured on different scales.

The blocking metric may be a measure of blockiness detected in the transcoded media content. Blockiness can be observed at the pixels around the borders of a block edge. The blocking metric may be a numerical value that is determined by comparing the pixels of the uploaded media content and the pixels of the transcoded media content at the borders of each block edge.

The ringing metric may be a measure of ringing. Ringing may refer to the observation of artifacts that appear in video data and/or audio data. In video data, ringing artifacts are artifacts that appear at sharp transitions in an image or series of images. Ringing artifacts may appear as bands near edges of objects in the image or images. In audio data, ringing artifacts are artifacts that appear as echoes or smearing of transient, short-duration sounds. For example, sounds such as percussions (e.g., drums) or certain plosive speech sounds may exhibit ringing artifacts. The ringing metric may be determined by performing edge detection on the transcoded media content, and pixels adjacent to the edge are compared between frames and with corresponding frames in the uploaded media content.

The noise metric may be a measurement of noise artifacts that are detected in the media content. Noise may be spatial and/or temporal. The noise metric may be a numerical value that is determined from the transcoded media content. Spatial noise may be determined in high frequencies fit to a noise model. Temporal noise may be determined by performing a multi-frame transformation (e.g., 3d-FFT) to estimate the power spectral density (PSD), and a noise-to-signal ratio may be measured.

The blurring metric may be a measurement of blurriness artifacts that are detected in the transcoded media content. The blurring metric may be a numerical value that is determined from the transcoded media content and the uploaded media content. The blurring metric may be determined by comparing the pixel values around a region in a frame compared relative to one another and then comparing the pixel values in a corresponding frame of the uploaded media content.

The banding metric may be a measurement of banding artifacts that are detected in the transcoded media content. The banding metric may be a numerical value that is determined from the transcoded media content and the uploaded media content. The banding metric may be determined by comparing variable detectable boundaries between homogeneous regions between frames in the transcoded media content with corresponding regions in the uploaded media content.

The jitter metric may be a measurement of jitter artifacts that are detected in the transcoded media content. The jitter metric may be a numerical value that is determined from the transcoded media content and the uploaded media content. The jitter metric may be determined by comparing irregular motion patterns in a frame sampling in the transcoded media content to a corresponding frame sampling in the uploaded media content.

The flicker metric may be a measurement of flicker artifacts that are detected in the transcoded media content. The flicker metric may be a numerical value that is determined from the transcoded media content and the uploaded media content. The flicker metric may be determined by detecting differences in a derivative of pixel luminance values for full frames in the transcoded media content and comparing the derivative with the derivative of pixel luminance values for full frames in the uploaded media content.

The saliency metric is a measurement of saliency that is observed in the transcoded media content. Saliency describes the uniqueness of qualities of a pixel relative to other pixels in an image or frame. The saliency metric may be a feature of the transcoded media content that is expressed as a numerical ratio that is determined from the transcoded media content. The saliency metric may be determined by segmenting pixels based on the intensity of each pixel and then measuring the contrast between the segments of pixels.

The temporal consistency metric is a measurement of temporal consistency in the transcoded media content. The temporal consistency metric may be a feature of the transcoded media content that is expressed as a numerical ratio that is determined from the transcoded media content. The temporal consistency metric may be measured by determining the magnitude of significant jumps in a first derivative of frame level pixel intensity across the transcoded media content.

The local motion saliency metric is a measurement of local motion saliency artifacts that are detected in the transcoded media content. The local motion saliency metric may be a numerical value that is determined based on the transcoded media content and the uploaded media content. The local motion saliency metric may be determined by comparing the texture variation between the most significant saliency segments (both spatial and temporal) in the frames of the transcoded media content with the most significant saliency segments (both spatial and temporal) in the frames of the uploaded media content.

The sharpness metric (or modulation transfer function metric) is a quality measurement of the sharpness (e.g., the clarity of detail) of the transcoded media content. The sharpness metric is a quality measurement that can be determined from the transcoded media content. The sharpness metric may be determined by performing a point spread function on various rows of pixels that are used for power-spectral density calculation.

The peak-signal-to-noise ratio metric is a quality measurement of the ratio between the power of a media signal and the power of the corrupting noise that affects the fidelity of the signal's representation. The peak-signal-to-noise metric may be a numerical ratio that is expressed in decibels and may be determined from the transcoded media content and the uploaded media content. The peak-signal-to-noise metric may be determined by determining a mean square error based on the differences in pixel values from the transcoded media content and the uploaded media content. The peak-signal-to-noise metric may be determined from the entropy in the mean square error.

The structural similarity metric is a quality measurement that measures the similarity between two images (e.g., a frame in the transcoded media content and a corresponding frame in the uploaded media content). The structural similarity metric may be a numerical ratio that is expressed in decibels. The structural similarity metric may be determined by computing and normalizing mean textures of the transcoded media content and the uploaded media content, and determining the difference therebetween.

The SLEEQ metric is a quality measurement. The SLEEQ metric is a numerical value that can be determined from the transcoded media content and the uploaded media content. The SLEEQ metric may be determined by calculating, for both the transcoded media content and the uploaded media content, a deviation of the generalized pixel distribution from a normal distribution.

The interlacing metric (or staircase metric) is a measurement of motion artifacts that are detected in the transcoded media content due to interlacing of frames. The interlacing metric may be a numerical value that can be determined from the transcoded media content and the uploaded media content. The interlacing metric may be determined by measuring edge pixels in a frame against each other with a differential operator and comparing the result with the same measurement performed on the uploaded media content.

The distortion metric is a measurement of distortion artifacts that are detected in the transcoded media content. The distortion metric may be a numerical ratio that is determined based on the transcoded media content and the uploaded content. The distortion metric may be determined by measuring pixel differences radially for the transcoded media content and the uploaded media content and determining ratios of first and second derivatives that are matched separately for the transcoded media content and the uploaded media content.

The warping metric is a measurement of warping artifacts that are detected in the transcoded media content. The warping metric may be a numerical ratio that is determined based on the transcoded media content and the uploaded media content. The warping metric may be determined by measuring, for both the transcoded media content and the uploaded media content, the horizontal, vertical, and diagonal edges within a region of pixels and comparing the measurements corresponding to the transcoded media content with those of the uploaded media content.

The foregoing listed degradation metrics are provided for example only. The quality scoring module 410 may collect/monitor/determine any other additional or alternative degradation metrics. Furthermore, the quality scoring module 410 may determine the degradation metrics in any suitable manner.

For each degradation metric, the quality scoring module 410 maps the degradation metric to a respective calibrated score. Calibrated scores are values on a common interval (e.g., between 0 and 1, or between 1 and 5). For example, in an implementation where the common interval is between 0 and 1, the calibrated scores may be mapped to one of 0, 0.25, 0.5, 0.75, and 1.0, where 0 corresponds to "excellent quality," 0.25 corresponds to "quality degradation is just noticeable for this aspect," 0.5 corresponds to "quality degradation is obvious but tolerable," 0.75 corresponds to "quality degradation is obvious and not tolerable," and 1.0 corresponds to "quality is extremely poor for this aspect."

For each particular degradation metric, the quality scoring module 410 may utilize a mapping mechanism that is trained to map a particular degradation metric value to a corresponding calibrated score. A mapping mechanism can be any suitable mechanism that maps a particular metric to an opinion score. For example, a mapping mechanism may be a mapping function or a lookup table. Each mapping mechanism can be determined empirically. In some implementations, the mapping mechanisms are learned in a supervised manner. For example, a group of test users (e.g., 100 or 1000 users) may be presented with media contents that have only one observable degradation quality. For example, the users may be presented with various media contents (e.g., videos and/or audio) that contain various amounts of blocking artifacts, but that otherwise do not include any observable degradation artifacts or errors. Users can rate the media contents as being one of: "excellent quality;" "quality degradation is just noticeable for this aspect;" "quality degradation is obvious but tolerable;" "quality degradation is obvious and not tolerable;" and "quality is extremely poor for this aspect." By analyzing user responses with respect to the media contents displaying varying degrees of blockiness, the training module (not shown) can learn which degrees of blockiness correspond to which ratings or calibrated scores. In this way, when a transcoded media content has a particular degree of blockiness, the mapping mechanism can map the degree of blockiness to one of the calibrated scores. The mapping mechanisms for each other monitored degradation metrics can be determined in a similar manner.

In operation, the quality scoring module 410 receives each of the particular degradation metric values and determines a respective calibrated score based on the particular degradation metric value and a mapping mechanism corresponding to the degradation metric type of the particular degradation metric value. Upon determining the calibrated scores, the quality scoring module 410 may determine an aggregated quality score of the media content by exponentiating each calibrated score with a respective weighting exponent and aggregating the exponentiated calibrated scores. In some implementations, each exponentiated calibrated score may be weighted by a weighting factor before aggregation. In some implementations, the quality scoring module 410 may determine the aggregated score of a media content according to the following exponential weighting function:

$$M = \Sigma_{i=0}^{N} \alpha_i m_i^\gamma$$

where M is the aggregated quality score, N is a total number of different degradation metrics represented in the plurality of degradation metric values, $m_i$ is the $i^{th}$ calibrated score of the plurality of calibrated scores, $\alpha_i$ is a weighting factor corresponding to the $i^{th}$ calibrated score, and $\gamma$ is the weighting exponent. In these implementations, $\gamma$ is a constant value, such that each calibrated score is exponentiated by the same value. By exponentiating each calibrated score, the value of a relatively poor degradation metric value may be magnified relative to otherwise tolerable degradation metric values. In this way, even if only one type of degradation artifact or error is observed in a media content, the presence of such degradation artifacts may be sufficient to trigger a reencoding of the media content, as will be discussed below.

In some implementations, the quality scoring module 410 may determine the aggregated quality score by exponentiating each calibrated score with a respective weighting exponent that corresponds to the type of degradation metric from which the calibrated score was determined. In these implementations, the quality scoring module 410 may penalize some types of degradation metrics more heavily than other degradation metrics. For instance, if the calibrated scores are scored on the interval of [0, 1], calibrated scores exponentiated by weighting exponents much greater than one (e.g., three, four, or five) correspond to degradation metrics that are relatively less important than degradation metrics whose calibrated scores are exponentiated by weighting exponents that are closer in value to one (e.g., two). Similarly, in implementations where the calibrated scores are scored on the interval of [1, 5], calibrated scores exponentiated by weighting exponents much greater than one (e.g., three, four, or five) correspond to degradation metrics that are relatively more important than degradation metrics whose calibrated scores are exponentiated by weighting exponents that are closer in value to one (e.g., two). In some implementations, the quality scoring module 410 may determine the aggregated score according to the following exponential weighting function:

$$M = \Sigma_{i=0}^{N} \alpha_i m_i^{\gamma_i}$$

where M is the aggregated quality score, N is a total number of different degradation metrics represented in the plurality of degradation metric values, $m_i$ is the $i^{th}$ calibrated score of the plurality of calibrated scores, $\alpha_i$ is a weighting factor corresponding to the $i^{th}$ calibrated score, and $\gamma_i$ is the respective weighting exponent that exponentiates the $i^{th}$ calibrated score. In these implementations, each weighting exponent ($\gamma_i$) may be selected based on the relative importance of the calibrated score ($m_i$) being exponentiated. In these implementations, the weighting exponents may be determined empirically.

The optimization module 412 receives the aggregated quality score and determines whether the encoding of the transcoded media content is optimized based on the aggregated quality score. In some implementations, the optimization module 412 may determine a transcoded media content to be optimized if the aggregated quality score is less than a maximum score threshold. In these implementations, the maximum score threshold may be empirically determined to ensure that no transcoded media content is streamed or transmitted if it does not meet a minimum standard. For example, a group of test users may consume media contents (e.g., watch videos) of varying quality, with each media content having an aggregated quality score associated therewith. The test users may rate the media contents on a scale, such as: "excellent," "good," "OK, but watchable/audible," "not good, barely watchable/audible," and "very poor." The maximum score threshold may be based on the aggregated quality scores of media contents where a substantial number of the test users deemed the quality to be just good enough to consume and the aggregated quality scores of media contents where a substantial number of the test users deemed the quality too poor to consume. Put another way, the maximum score threshold may be indicative of video/audio quality that is the border between consumable and non-consumable media content.

In these implementations, the optimization module 412 can determine whether the media content needs to be reencoded based on the comparison. When the aggregated quality score is greater than the maximum score threshold, the optimization module 412 determines that the media content needs to be reencoded. In response to this determination, the optimization module 412 may determine one or more updated encoding parameters with which the media content will be reencoded. For example, the optimization module 412 may determine an increased bitrate that is greater than the bitrate of the transcoded media content. The optimization module 412 may additionally or alternatively determine updated motion parameters, quantizing parameters, and/or deblocking filter parameters. The updated encoding parameters may be selected to improve the quality of the subsequent encoding. In response to determining the updated encoding parameters, the optimization module 412 instructs the media content encoder 408 to reencode the media content using the updated encoding parameters. In some implementations, the media content encoder 408 may retrieve the intermediate media content and may encode the intermediate media content using the updated encoding parameters. In other implementations, the media content encoder 408 may retrieve the uploaded media content and may encode the uploaded media content using the updated encoding parameters.

In some implementations, the optimization module 412 may determine whether a transcoded media content needs to be optimized based on the aggregated quality score, a maximum threshold, and a lower threshold. In these implementations, the optimization module 412 determines that the transcoded media content needs to be optimized if the aggregated quality score is greater than a maximum score threshold or less than a lower score threshold. In these implementations, the optimization module 412 is configured to balance the need for consumable media contents and the need to reduce the amount of storage to store the media contents and/or the bandwidth used to deliver the media contents to a receiving station 106, both of which are significant costs to a large-scale media processing infrastructure. In these implementations, the maximum score threshold may be determined empirically, as was described above. Similarly, the lower score threshold may be determined empirically. For example, a group of test users may consume media contents that have relatively low aggregated quality scores (which tend to denote high quality encodings). The test users may rate the overall quality of the media contents on a scale, such as "excellent," "good," "OK, but watchable/audible," "not good, barely watchable/audible," and "very poor." The lower score threshold may be determined based on the ratings that are collected from the test users for the various media contents. The lower score threshold may be indicative of aggregated quality scores where a substantial number of users begin to notice artifacts in the media content. Thus, the lower score threshold may correspond to the aggregated quality scores where users begin to discern degradation artifacts in media contents. In this way, the optimization module 412 can determine whether the quality of the encoding is too good, such that the transcoded media content is likely using too much storage space and/or bandwidth.

In operation, the optimization module 412 compares the aggregated quality score of the transcoded media content with the maximum score threshold and the lower score threshold. If the aggregated quality score is less than the maximum score threshold and greater than the lower score threshold, the optimization module 412 determines that the encoding of the transcoded media content is optimized, and stores or transmits the transcoded media content. If the aggregated quality score is greater than the maximum score threshold or less than the lower score threshold, the optimization module 412 determines updated encoding parameters and instructs the media content encoder 408 to reencode the media content using the updated encoding parameters.

When the aggregated quality score is greater than the maximum score threshold, the optimization module 412 determines the updated encoding parameters to improve the overall quality of the media content. For example, the optimization module 412 may determine an increased bitrate that is greater than the bitrate of the transcoded media content. The optimization module 412 may additionally or alternatively determine updated motion parameters, quantizing parameters, and/or deblocking filter parameters that would improve the overall quality of the transcoded media content.

When the aggregated quality score is less than the lower score threshold, the optimization module 412 determines the updated encoding parameters to decrease the overall size (i.e., the number of bits) of the transcoded media content, which may reduce the overall quality of the media content. For example, the optimization module 412 may determine a decreased bitrate that is less than the bitrate of the transcoded media content. The optimization module 412 may additionally or alternatively determine updated motion parameters, quantizing parameters, and/or deblocking filter parameters that would decrease the overall size of the transcoded media content.

In response to determining the updated encoding parameters, the optimization module 412 instructs the media content encoder 408 to reencode the media content using the updated encoding parameters. In some implementations, the media content encoder 408 may retrieve the intermediate media content from storage and may encode the intermediate media content using the updated encoding parameters to obtain the transcoded media content, which is encoded using the updated encoding parameters. In other implementations, the media content encoder 408 may retrieve the uploaded media content and may encode the uploaded media content using the updated encoding parameters.

In some implementations, the optimization module 412 may utilize different lower score thresholds depending on a predicted popularity of the media content. For example, media contents that are likely to be popular (e.g., predicted to have more than a million views or downloads) will inherently require more bandwidth than media contents predicted to be less popular. Furthermore, more popular media contents may be cached at various network nodes to decrease download times. Thus, media contents that are more likely to be popular are likely to require more storage space across a network. Thus, to reduce the storage and bandwidth requirements associated with delivering more popular media contents, the lower score threshold for more popular media contents may be relatively higher than lower score thresholds for less popular media contents. In this way, a large-scale media processing infrastructure may improve its operational efficiency by using different lower score thresholds for media contents of varying popularity or predicted popularity.

The media content transmitter 414 is configured to transmit or communicate the encoded media content over the communication network 104. For example, the media content transmitter 414 may transmit the transcoded media content to the receiving station 106 via the communication network 104. The media content transmitter 414 may transmit or communicate the encoded media content using any suitable transmission or communications protocol. Furthermore, the media content transmitter 414 may be implemented to support distributed transmission of the transcoded media content.

The receiving station 106 is configured to receive the transcoded media content, as described above. The media content decoder 416 is configured to decode the transcoded media content according to the media content scheme used to encode the transcoded media content, as described above. The media content display 418 may include any suitable display, such as the display 218 of the computing device 200, as described above. The media content display 418 is configured to display the decoded media content, for example, for viewing by a consumer of the media content using a media content viewing application (e.g., a media content viewing application installed on the computing device 200, a web-based media content viewing application, or other suitable media content viewing application).

Figure 5:
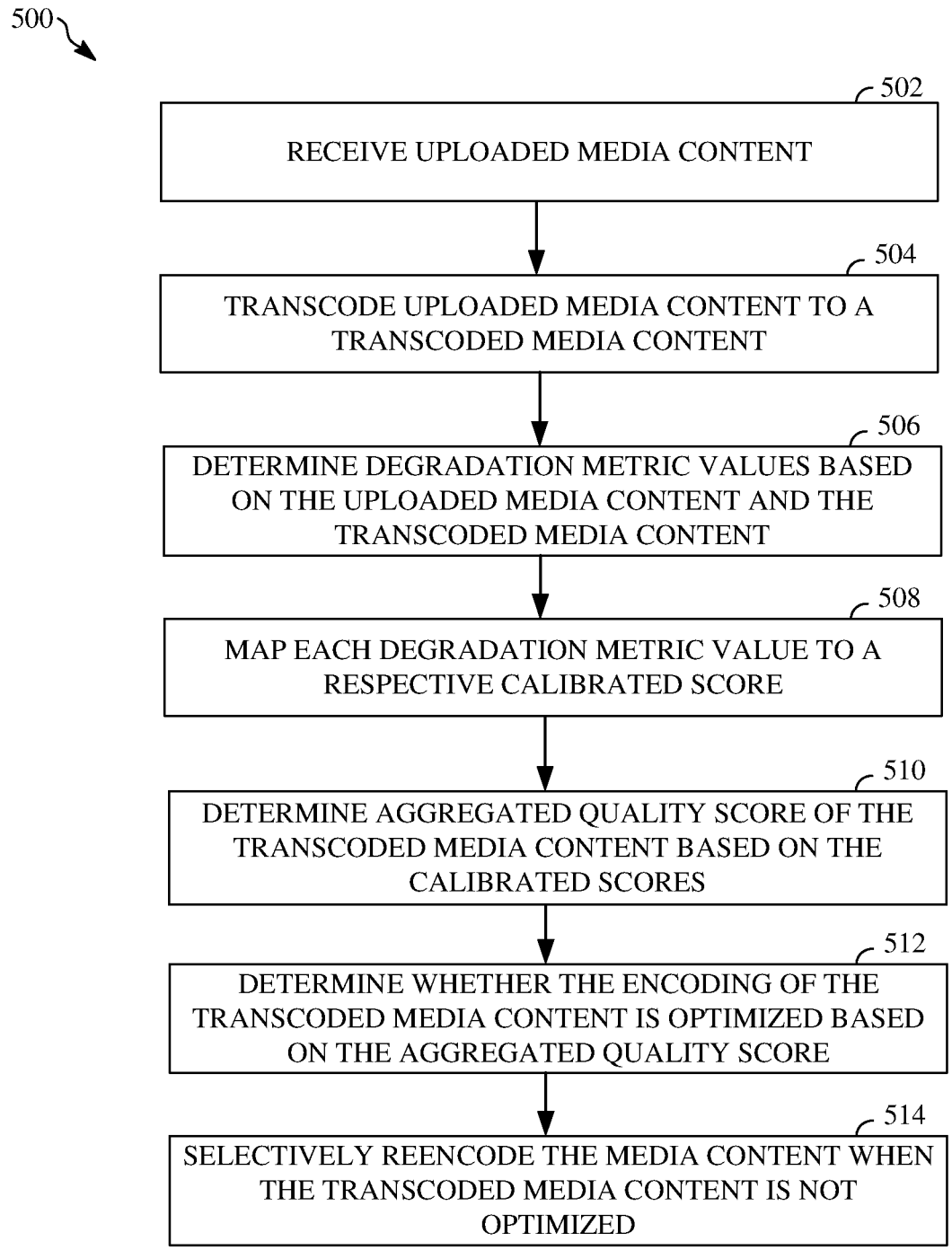
FIG. 5 is a flowchart illustrating a set of operations of a method for efficiently encoding a media content.

FIG. 5 is a flowchart illustrating an example set of operations of a method 500 for efficiently encoding a media content. The method 500 is described with respect to the transmitting station of FIG. 4. The method 500 may be performed, however, by any other suitable computing system.

At 502, the transmitting station 102 receives the uploaded media content from a media content uploader 404. The media content uploader 404 is configured to upload media content generated by the media content generator 402 to the transmitting station 102. The media content uploader 404 may encode the media content using any suitable video and/or audio codec before uploading the media content to the transmitting station 102.

At 504, the transmitting station 102 transcodes the uploaded media content to a transcoded media content. In some implementations, the media content preprocessor 406 is configured to receive the uploaded media content and to preprocess the uploaded media content. For example, the media content preprocessor 406 may decode the uploaded media content into an intermediate media content. The media content preprocessor 406 may utilize the appropriate codec to decode the uploaded media content into the intermediate media content. The media content preprocessor 406 may perform other suitable processes to improve the quality of the media content. In some implementations, the media content preprocessor 406 may chunk the intermediate media content into a series of chunks. In doing so, the media content encoder 408 may encode the chunks of the intermediate media content in a parallel and/or distributed manner. In implementations where the media content preprocessor 406 does not generate an intermediate media content, the media content preprocessor 406 may be configured to chunk the uploaded media content into a series of chunks, such that the chunks of the uploaded media content may be encoded in a parallel and/or distributed manner.

The media content encoder 408 obtains the intermediate media content or the uploaded media content and encodes the intermediate media content or the uploaded media content according to a media content coding scheme. In some implementations, the media content encoder 408 receives the intermediate media content or the uploaded media content from the media content preprocessor 406. Additionally or alternatively, the media content preprocessor 406 stores the intermediate media content or the uploaded media content in storage, and the media content encoder 408 may retrieve the intermediate media content or the uploaded media content from storage at a later time. The media content encoder 408 may implement one or more video and/or audio codecs to encode the media content. The media content encoder 408 may encode the intermediate media content (or the chunks that make up the intermediate media content) or the uploaded media content (or the chunks that make up the uploaded media contents) into one or more transcoded media contents. The media content encoder 408 may transcode each transcoded media content into a respective format (e.g., 4 k, 1080p, 720p, 480p, 360p, 240p, etc.). In this way, the transmitting station 102 can support a number of different requests and provide transcoded media content to different types of devices. For purposes of explanation, the media content encoder 408 is described as encoding one transcoded media content. Operations 504-514 may be performed multiple times to support the transcoding of more than one transcoded media content.

In encoding the intermediate media content or the uploaded media content into a transcoded media content, the media content encoder 408 may receive a set of encoding parameters. The encoding parameters may define the settings with which the transcoded media content is encoded. The encoding parameters may include a bitrate at which the transcoded media content is encoded, the motion parameters that are used to encode the transcoded media content, the quantization parameters used to encode the transcoded media content, deblocking filter parameters, and/or any other suitable parameters. Each of the encoding parameters may be adjusted to improve or reduce the video quality and/or the size of the transcoded media content. The media content encoder 408 receives the encoding parameters and encodes the intermediate media content or the uploaded media content into a transcoded media content. Upon completing the encoding, the media content encoder 408 outputs the transcoded media content. The media content encoder 408 may output the transcoded media content to storage, to the quality scoring module 410, or to the media content transmitter 414.

At 506, the transmitting station 102 determines degradation metric values corresponding to the transcoded media content based on the uploaded media content and the transcoded media content. The quality scoring module 410 determines two or more degradation metric values corresponding to the transcoded media content in view of the uploaded media content. The degradation metrics may be metrics associated with artifacts, features, and errors that contribute to reducing the quality of the video. The degradation metrics may include, but are not limited to, a blocking metric, a blurring metric, a ringing metric, a noise metric, a banding metric, a jitter metric, a flicker metric, a saliency metric, a temporal consistency metric, a local motion saliency metric, a sharpness or modulation transfer function metric, a peak-signal-to-noise metric, a structural similarity (SSIM) metric, a self-reference based learning-free evaluation of quality (SLEEQ) metric, an interlacing or staircase metric, a distortion metric, and/or a warping metric. The foregoing listed degradation metrics are provided for example only. The quality scoring module 410 may collect/monitor/determine any other additional or alternative degradation metrics. Each of these degradation metric values may be measured on different scales. The quality scoring module 410 may determine the degradation metric values in any suitable manner.

At 508, the transmitting station 102 maps each degradation metric value to a respective calibrated score. For each degradation metric, the quality scoring module 410 maps the degradation metric to a respective calibrated score. Calibrated scores are values on a common interval (e.g., between 0 and 1, or between 1 and 5). For each particular degradation metric, the quality scoring module 410 may utilize a mapping mechanism that is trained to map a particular degradation metric value to a corresponding calibrated score. A mapping mechanism can be any suitable mechanism that maps a particular metric to an opinion score. For example, a mapping mechanism may be a mapping function or a lookup table. Each mapping mechanism can be determined empirically. In some implementations, the mapping mechanisms are learned in a supervised manner, as was described above. For each degradation metric value, the quality scoring module 410 obtains a mapping mechanism corresponding to the degradation metric type of the metric value, and determines a calibrated score based on the degradation metric value and the mapping mechanism.

At 510, the transmitting station 102 determines an aggregated quality score of the transcoded media content based on the calibrated scores. Upon determining the calibrated scores, the quality scoring module 410 may determine an aggregated quality score of the transcoded media content by exponentiating each calibrated score with a respective weighting exponent and aggregating the exponentiated calibrated scores. In some implementations, each exponentiated calibrated score may be weighted by a weighting factor before aggregation.

In some implementations, the quality scoring module 410 may determine the aggregated score of a media content according to the following exponential weighting function:

$$M = \Sigma_{i=0}^{N} \alpha_i m_i^{\gamma}$$

where M is the aggregated quality score, N is a total number of different degradation metrics represented in the plurality of degradation metric values, $m_i$ is the $i^{th}$ calibrated score of the plurality of calibrated scores, $\alpha_i$ is a weighting factor corresponding to the $i^{th}$ calibrated score, and $\gamma$ is the weighting exponent. In these implementations, $\gamma$ is a constant value, such that each calibrated score is exponentiated by the same value. By exponentiating each calibrated score, the value of a relatively poor degradation metric value may be magnified relative to otherwise tolerable degradation metric values.

In some implementations, the quality scoring module 410 may determine the aggregated quality score by exponentiating each calibrated score with a respective weighting exponent that corresponds to the type of degradation metric from which the calibrated score was determined. In these implementations, the quality scoring module 410 may penalize some types of degradation metrics more heavily than other degradation metrics. For instance, if the calibrated scores are scored on the interval of [0, 1] (with zero being the best and one being the worst), calibrated scores exponentiated by weighting exponents much greater than one (e.g., three, four, or five) correspond to degradation metrics that are relatively less important than degradation metrics whose calibrated scores are exponentiated by weighting exponents that are closer in value to one (e.g., two). Similarly, in implementations where the calibrated scores are scored on the interval of [1, 5] (with one being the best and five being the worst), calibrated scores exponentiated by weighting exponents much greater than one (e.g., three, four, or five) correspond to degradation metrics that are relatively more important than degradation metrics whose calibrated scores are exponentiated by weighting exponents that are closer in value to one (e.g., two). In some implementations, the quality scoring module 410 may determine the aggregated score according to the following exponential weighting function:

$$M = \Sigma_{i=0}^{N} \alpha_i m_i^{\gamma_i}$$

where M is the aggregated quality score, N is a total number of different degradation metrics represented in the plurality of degradation metric values, $m_i$ is the $i^{th}$ calibrated score of the plurality of calibrated scores, $\alpha_i$ is a weighting factor corresponding to the $i^{th}$ calibrated score, and $\gamma_i$ is the respective weighting exponent that exponentiates the $i^{th}$ calibrated score. In these implementations, each weighting exponent ($\gamma_i$) may be selected based on the relative importance of the calibrated score ($m_i$) being exponentiated. In these implementations, the weighting exponents may be determined empirically based on feedback provided from test users.

At 512, the transmitting station 102 determines whether the encoding of the transcoded media content is optimized based on the aggregated quality score. The optimization module 412 receives the aggregated quality score and determines whether the encoding of the transcoded media content is optimized based on the aggregated quality score.

In some implementations, the optimization module 412 may determine a transcoded media content to be optimized if the aggregated quality score is greater than a maximum score threshold. In these implementations, the maximum score threshold may be empirically determined to ensure that no media content is streamed or transmitted if it does not meet a minimum quality standard. The optimization module 412 can determine whether the media content is optimized (e.g., needs to be reencoded) based on the comparison.

In some implementations, the optimization module 412 may determine whether a transcoded media content needs to be optimized based on the aggregated quality score, a maximum threshold, and a lower threshold. In these implementations, the optimization module 412 determines that the transcoded media content needs to be optimized (e.g., either needs to be reencoded or needs a reduction in quality) if the aggregated quality score is greater than a maximum score threshold or less than a lower score threshold. In these implementations, the optimization module 412 is configured to balance the need for consumable media contents and the need to reduce the amount of storage to store the media contents and/or the bandwidth used to deliver the media contents to a receiving station 106, both of which are significant costs to a large-scale media processing infrastructure. In these implementations, the maximum score threshold and the lower score threshold may be determined empirically. The lower score threshold may be indicative of aggregated quality scores where a substantial number of users begin to notice artifacts in the media content. In operation, the optimization module 412 compares the aggregated quality score of the transcoded media content with the maximum score threshold and the lower score threshold to determine whether the transcoded media content needs to be optimized.

In some implementations, the optimization module 412 may utilize different lower score thresholds depending on a popularity or predicted popularity of the media content. In these implementations, the optimization module 412 may determine a popularity or a predicted popularity of the media content and may select the lower score threshold based on the popularity or predicted popularity. The optimization module 412 may determine the popularity of a media content based on the number of downloads and/or streams of the media content. The optimization module 412 may determine a predicted popularity of a media content based on any number of factors and using any number of techniques. For example, the optimization module 412 may look to a total number of followers that an uploading entity has or the number of downloads or streams that the uploader has for previously uploaded media contents. These values may be used to predict a popularity of the media content. For instance, the optimization module 412 may utilize machine learning techniques or a lookup table to determine the predicted popularity of the media content.

At 514, the transmitting station 102 selectively reencodes the media content when the transcoded media content is not optimized. The transmitting station 102 may determine to reencode when the aggregated quality score is too high (i.e., the quality is poor). In other implementations, the transmitting station 102 may determine to reencode when the aggregated quality score is too high or too low (i.e., the quality is poor or the quality is too good).

In some implementations, the optimization module 412 determines whether to reencode the media content by comparing the aggregated content score to the maximum score threshold. When the aggregated quality score is greater than the maximum score threshold, the optimization module 412 determines that the media content needs to be reencoded. In response to this determination, the optimization module 412 may determine one or more updated encoding parameters with which the media content will be reencoded. For example, the optimization module 412 may determine an increased bitrate that is greater than the bitrate of the transcoded media content. The optimization module 412 may additionally or alternatively determine updated motion parameters, quantizing parameters, and/or deblocking filter parameters. The updated encoding parameters may be selected to improve the quality of the subsequent encoding. In response to determining the updated encoding parameters, the optimization module 412 instructs the media content encoder 408 to reencode the media content using the updated encoding parameters. The media content encoder 408 may retrieve the intermediate media content or the uploaded content and may encode the intermediate media content or the uploaded media content using the updated encoding parameters. It is noted that upon reencoding the media content, operations 504, 506, 508, 510, 512, and 514 may be performed again.

In some implementations, the optimization module 412 determines whether to reencode the media content by comparing the aggregated content score to the maximum score threshold and a lower score threshold. In some of these implementations, the lower score threshold may be determined based on the popularity or predicted popularity of the media content. If the aggregated quality score is less than the maximum score threshold and greater than the lower score threshold, the optimization module 412 determines that the encoding of the transcoded media content is optimized, and stores or transmits the transcoded media content. If the aggregated quality score is greater than the maximum score threshold or less than the lower score threshold, the optimization module 412 determines updated encoding parameters and instructs the media content encoder 408 to reencode the media content using the updated encoding parameters. It is noted that upon reencoding the media content, operations 504, 506, 508, 510, 512, and 514 may be performed again.

When the aggregated quality score is greater than the maximum score threshold, the optimization module 412 determines the updated encoding parameters to improve the overall quality of the media content. For example, the optimization module 412 may determine an increased bitrate that is greater than the bitrate of the transcoded media content. The optimization module 412 may additionally or alternatively determine updated motion parameters, quantizing parameters, and/or deblocking filter parameters that would improve the overall quality of the transcoded media content.

When the aggregated quality score is less than the lower score threshold, the optimization module 412 determines the updated encoding parameters to decrease the overall quality of the media content in order to reduce the size of the transcoded media content. For example, the optimization module 412 may determine a decreased bitrate that is less than the bitrate of the transcoded media content. The optimization module 412 may additionally or alternatively determine updated motion parameters, quantizing parameters, and/or deblocking filter parameters that would decrease the overall size of the transcoded media content.

In response to determining the updated encoding parameters, the optimization module 412 instructs the media content encoder 408 to reencode the media content using the updated encoding parameters. The media content encoder 408 may retrieve the intermediate media content or the uploaded media content and may encode the intermediate media content or the uploaded media content using the updated encoding parameters.

The method 500 of FIG. 5 is provided for example and not intended to limit the scope of the disclosure. The method 500 may include additional or alternative operations. For example, the method 500 may include transmitting the transcoded media content to a receiving station. Furthermore, the method 500 may be executed as part of an encoding pipeline, whereby the method 500 may be performed on chunks of the media content, rather than the entire media content itself.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clearly indicated by the context to be directed to a singular form. Moreover, use of the term "an implementation" or "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms, and/or instructions described herein. In addition, or alternatively, for example, a special-purpose computer/processor can be utilized, which special-purpose computer/processor can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of the present invention and do not limit the present invention. On the contrary, the invention is intended to cover various modifications and equivalent arrangements included within the scope of the appended claims, which scope is to be accorded the broadest interpretation as is permitted by law so as to encompass all such modifications and equivalent arrangements.

What is claimed is:

1. A method comprising:
receiving, by one or more processors, an uploaded media content;
obtaining, by the one or more processors, a transcoded media content, wherein the transcoded media content is transcoded from the uploaded media content;
determining, by the one or more processors, a plurality of degradation metric values corresponding to the transcoded media content based on the uploaded media content and the transcoded media content, each degradation metric value corresponding to a different degradation metric type;
mapping, by the one or more processors, each degradation metric value of the plurality of degradation metric values to a respective calibrated score to obtain a plurality of calibrated scores, wherein the plurality of calibrated scores are all numerical values on a common interval;
determining, by the one or more processors, an aggregated quality score of the transcoded media content based on the plurality of calibrated scores and an exponential weighting function, wherein the exponential weighting function exponentiates each of the calibrated scores by a respective weighting exponent and aggregates the exponentiated calibrated scores; and
selectively reencoding, by the one or more processors, the transcoded media content based on the aggregated quality score, wherein selectively reencoding the transcoded media content based on the aggregated quality score includes:
determining a predicted demand for the transcoded media content;
determining a bitrate of the transcoded media content;
determining a maximum score threshold and a lower score threshold based on the predicted demand;
when the aggregated quality score is less than the maximum score threshold and greater than the lower score threshold, storing the transcoded media content;
when the aggregated quality score is greater than the maximum score threshold, reencoding the uploaded media content at an increased bitrate that is greater than the bitrate of the transcoded media content; and
when the aggregated quality score is less than the lower score threshold, reencoding the uploaded media content at a decreased bitrate that is less than the bitrate of the transcoded media content.

2. The method of claim 1, wherein each of the respective weighting exponents is equal to a same constant value.

3. The method of claim 2, wherein the exponential weighting function is:

$$M=\Sigma_{i=0}^{N}\alpha_i m_i^{\gamma}$$

where M is the aggregated quality score, N is a total number of different degradation metrics represented in the plurality of degradation metric values, $m_i$ is an $i^{th}$ calibrated score of the plurality of calibrated scores, $\alpha_i$ is a weighting factor corresponding to the $i^{th}$ calibrated score, and $\gamma$ is the weighting exponent.

4. The method of claim 1, wherein each respective weighting exponent is specific to the respective calibrated score that the respective weighting exponent exponentiates.

5. The method of claim 4, wherein the exponential weighting function is:

$$M=\Sigma_{i=0}^{N}\alpha_i m_i^{\gamma}$$

where M is the aggregated quality score, N is a total number of different degradation metrics represented in the plurality of degradation metric values, $m_i$ is an $i^{th}$ calibrated score of the plurality of calibrated scores, $\alpha_i$ is a weighting factor corresponding to the $i^{th}$ calibrated score, and $\gamma$ is the respective weighting exponent that exponentiates the $i^{th}$ calibrated score.

6. The method of claim 1, wherein mapping each degradation metric value of the plurality of degradation metric values to a respective calibrated score includes:
for each degradation metric value:
obtaining a mapping mechanism corresponding to the degradation metric type of the degradation metric value; and
inputting the degradation metric value to the mapping mechanism to obtain the respective calibrated score.

7. The method of claim 1, wherein obtaining the transcoded media content includes:
   receiving one or more encoding parameters; and
   encoding the uploaded media content into the transcoded media content using the one or more encoding parameters.

8. The method of claim 1, wherein the transcoded media content includes video content and/or audio content.

9. A media content delivery system comprising:
   a non-transitory storage that stores computer-readable data;
   a network interface;
   one or more processors that execute computer-executable instructions that cause the one or more processors to:
      receive an uploaded media content via the network interface;
      obtain a transcoded media content, wherein the transcoded media content is transcoded from the uploaded media content;
      determine a plurality of degradation metric values corresponding to the transcoded media content based on the uploaded media content and the transcoded media content, each degradation metric value corresponding to a different degradation metric type;
      map each degradation metric value of the plurality of degradation metric values to a respective calibrated score to obtain a plurality of calibrated scores, wherein the plurality of calibrated scores are all numerical values on a common interval;
      determine an aggregated quality score of the transcoded media content based on the plurality of calibrated scores and an exponential weighting function, wherein:
         the exponential weighting function exponentiates each of the calibrated scores by a respective weighting exponent and aggregates the exponentiated calibrated scores, and
         each weighting exponent is greater than 1; and
      selectively reencode the transcoded media content based on the aggregated quality score.

10. The media content delivery system of claim 9, wherein each of the respective weighting exponents is equal to a same constant value.

11. The media content delivery system of claim 10, wherein the exponential weighting function is:

$$M = \Sigma_{i=0}^{N} \alpha_i m_i^{\gamma}$$

where M is the aggregated quality score, N is a total number of different degradation metrics represented in the plurality of degradation metric values, $m_i$ is an $i^{th}$ calibrated score of the plurality of calibrated scores, $\alpha_i$ is a weighting factor corresponding to the $i^{th}$ calibrated score, and $\gamma$ is the weighting exponent.

12. The media content delivery system of claim 9, wherein each respective weighting exponent is specific to the respective calibrated score that the respective weighting exponent exponentiates.

13. The media content delivery system of claim 12, wherein the exponential weighting function is:

$$M = \Sigma_{i=0}^{N} \alpha_i m_i^{\gamma}$$

where M is the aggregated quality score, N is a total number of different degradation metrics represented in the plurality of degradation metric values, $m_i$ is an $i^{th}$ calibrated score of the plurality of calibrated scores, $\alpha_i$ is a weighting factor corresponding to the $i^{th}$ calibrated score, and $\gamma$ is the respective weighting exponent that exponentiates the $i^{th}$ calibrated score.

14. The media content delivery system of claim 9, wherein mapping each degradation metric value of the plurality of degradation metric values to a respective calibrated score includes:
   for each degradation metric value:
      obtaining a mapping mechanism corresponding to the degradation metric type of the degradation metric value; and
      inputting the degradation metric value to the mapping mechanism to obtain the respective calibrated score.

15. The media content delivery system of claim 9, wherein selectively reencoding the transcoded media content based on the aggregated quality score includes:
   determining a predicted demand for the transcoded media content;
   determining a bitrate of the transcoded media content;
   determining a maximum score threshold and a lower score threshold based on the predicted demand;
   when the aggregated quality score is less than the maximum score threshold and greater than the lower score threshold, storing the transcoded media content in the non-transitory storage;
   when the aggregated quality score is greater than the maximum score threshold, reencoding the uploaded media content at an increased bitrate that is greater than the bitrate of the transcoded media content; and
   when the aggregated quality score is less than the lower score threshold, reencoding the uploaded media content at a decreased bitrate that is less than the bitrate of the transcoded media content.

16. The media content delivery system of claim 9, wherein obtaining the transcoded media content includes:
   receiving one or more encoding parameters; and
   transcoding the uploaded media content into the transcoded media content using the one or more encoding parameters.

17. The media content delivery system of claim 9, wherein the transcoded media content includes video content and/or audio content.

18. The media content delivery system of claim 9, wherein to selectively reencode the transcoded media content based on the aggregated quality score comprises to:
   compare the aggregated quality score to a maximum score threshold;
   when the aggregated quality score is less than the maximum score threshold, store the transcoded media content; and
   when the aggregated quality score is greater than the maximum score threshold:
      adjust one or more encoding parameters to decrease the aggregated quality score; and
      reencode the uploaded media content based on the adjusted encoding parameters.

19. The media content delivery system of claim 9, wherein each of the respective weighting exponents is equal to a same constant value.

20. A media content delivery system, comprising:
   a non-transitory storage that stores computer-readable data;
   a network interface; and
   one or more processors that execute computer-executable instructions that cause the one or more processors to:
      receive an uploaded media content via the network interface;

obtain a transcoded media content, wherein the transcoded media content is transcoded from the uploaded media content;

determine a plurality of degradation metric values corresponding to the transcoded media content based on the uploaded media content and the transcoded media content, each degradation metric value corresponding to a different degradation metric type;

map each degradation metric value of the plurality of degradation metric values to a respective calibrated score to obtain a plurality of calibrated scores, wherein the plurality of calibrated scores are all numerical values on a common interval;

determine a aggregated quality score of the transcoded media content based on the plurality of calibrated scores and an exponential weighting function, wherein the exponential weighting function exponentiates each of the calibrated scores by a respective weighting exponent and aggregates the exponentiated calibrated scores, and wherein by exponentiating each calibrated score, the value of a poor degradation metric value is magnified relative to a better degradation metric value; and selectively reencode the transcoded media content based on the aggregated quality score, wherein selectively reencoding the transcoded media content based on the aggregated quality score includes:

comparing the aggregated quality score to a maximum score threshold;

when the aggregated quality score is less than the maximum score threshold, storing the transcoded media content in the non-transitory storage; and when the aggregated quality score is greater than the maximum score threshold:

adjusting one or more encoding parameters to decrease the aggregated quality score; and reencoding the uploaded media content based on the adjusted encoding parameters.

* * * * *